US010859285B2

United States Patent
Grogg et al.

(10) Patent No.: US 10,859,285 B2
(45) Date of Patent: Dec. 8, 2020

(54) CONTROL ADAPTER FOR FASTENING ON A DEVICE OF AN HVAC SYSTEM

(71) Applicant: Belimo Holding AG, Hinwil (CH)

(72) Inventors: Silvio Grogg, Gossau (CH); Marc Steiner, Einsiedeln (CH)

(73) Assignee: BELIMO HOLDING AG, Hinwil (CH)

( * ) Notice: Subject to any disclaimer, the term of this patent is extended or adjusted under 35 U.S.C. 154(b) by 179 days.

(21) Appl. No.: 16/092,824

(22) PCT Filed: Apr. 12, 2017

(86) PCT No.: PCT/IB2017/052119
§ 371 (c)(1),
(2) Date: Oct. 11, 2018

(87) PCT Pub. No.: WO2017/178990
PCT Pub. Date: Oct. 19, 2017

(65) Prior Publication Data
US 2019/0203967 A1  Jul. 4, 2019

(30) Foreign Application Priority Data

Apr. 15, 2016 (DE) .......................... 10 2016 107 000
Apr. 15, 2016 (DE) ..................... 20 2016 102 006 U

(51) Int. Cl.
*F24F 11/56*  (2018.01)
*H04W 4/80*  (2018.01)
(Continued)

(52) U.S. Cl.
CPC .............. *F24F 11/56* (2018.01); *F24F 11/89* (2018.01); *G05B 19/042* (2013.01);
(Continued)

(58) Field of Classification Search
None
See application file for complete search history.

(56) References Cited

U.S. PATENT DOCUMENTS 9,608,327 B1 * 3/2017 Tai .......................... H01Q 1/243
2007/0171073 A1   7/2007 Ariyoshi et al.
(Continued)

FOREIGN PATENT DOCUMENTS

DE         2020267 U1    8/2003
DE    102006060425 A1    8/2007
(Continued)

OTHER PUBLICATIONS

Lee, "Nexus 7 NFC Extender", Jul. 2015, 0x7D.com, pp. 1-3 (Year: 2015).*

(Continued)

*Primary Examiner* — Mohammad Ali
*Assistant Examiner* — David Earl Ogg
(74) *Attorney, Agent, or Firm* — Pearne & Gordon LLP

(57) ABSTRACT

A control adapter for fastening on a HVAC device includes a wireless communication interface for communicating control signals between a remote control device and the control adapter. A wireless near-field communication interface communicates control signals between the control adapter and the HVAC device. A control circuit converts the control signals received from the wireless communications interface into the control signals of the wireless near-field communication interface and converts the control signals received from the wireless near-field communication interface into control signals of the wireless communication interface.

18 Claims, 3 Drawing Sheets

(51) Int. Cl.
*G05B 19/418* (2006.01)
*H04Q 9/00* (2006.01)
*G08C 17/02* (2006.01)
*F24F 11/89* (2018.01)
*G05B 19/042* (2006.01)
*H04L 12/28* (2006.01)
*H04W 84/12* (2009.01)

(52) U.S. Cl.
CPC ......... *G05B 19/4185* (2013.01); *G08C 17/02* (2013.01); *H04Q 9/00* (2013.01); *H04W 4/80* (2018.02); *G05B 2219/25181* (2013.01); *G05B 2219/25196* (2013.01); *G05B 2219/2614* (2013.01); *G05B 2219/2642* (2013.01); *G05B 2219/37494* (2013.01); *H04L 12/2816* (2013.01); *H04W 84/12* (2013.01)

(56) References Cited

U.S. PATENT DOCUMENTS

| | | | |
|---|---|---|---|
| 2009/0027189 A1 | 1/2009 | Isaksson et al. | |
| 2014/0113548 A1* | 4/2014 | Camulli | H04M 3/5231 455/41.1 |
| 2014/0194056 A1* | 7/2014 | Barrett | H04M 1/6091 455/41.1 |
| 2014/0207290 A1* | 7/2014 | Crawford | H04W 8/22 700/276 |
| 2015/0155892 A1* | 6/2015 | Haase | H01Q 1/2291 455/129 |
| 2016/0061468 A1* | 3/2016 | Alexander | F24F 11/30 700/276 |
| 2017/0328367 A1* | 11/2017 | Frilev | F04D 13/0686 |

FOREIGN PATENT DOCUMENTS

| | | |
|---|---|---|
| DE | 102013113258 A1 | 6/2015 |
| WO | 2016086986 A1 | 6/2016 |

OTHER PUBLICATIONS

International Search Report for PCT/IB2017/052119 dated Sep. 22, 2017.
Written Opinion for PCT/IB2017/052119 dated Sep. 22, 2017.

* cited by examiner

CONTROL ADAPTER FOR FASTENING ON A DEVICE OF AN HVAC SYSTEM

TECHNICAL BACKGROUND

The invention relates to a control adapter for fastening on a device of a heating, ventilation and/or air conditioning system (HVAC system), in particular in the field of building technology.

PRIOR ART

HVAC systems have a large number of HVAC devices, such as actuators, sensors and control devices, for controlling the HVAC system. The actuators actuate a position of a valve or of a flap for controlling the flow of a fluid, e.g. water or air. The sensors supply the actuators and control devices with necessary information for controlling the HVAC system. Control devices are connected to the sensors and actuators in order to control the HVAC system. HVAC devices often have wireless near-field communication interfaces (NFC) in order to set and read out parameters. Therefore, for example a parameter such as the maximum angle, the rotational speed, etc. can be read out or set in an actuator. Since these HVAC devices are often accessible only with difficulty, e.g. in the ceiling of a building, and a user has to hold his operator control device very close to the NFC interface for communication with the HVAC device or has to connect a cable to the HVAC device parameterizing the HVAC device is often laborious for the user. When parameterization by means of near-field communication interfaces is used it is advantageous, in particular, that the latter functions even without the HVAC device being energized, which is important, in particular, in the construction phase of buildings. Therefore, the HVAC devices can already be set during assembly without the need for a power supply.

Outside the field of HVAC systems it is known from US20090027189 to use a control adapter for actuators and sensors in order to control the fabrication process in factories. The control adapter communicates with the actuators and sensors via an NFC interface and with an operator control center via a wireless communication interface. The control adapter analyzes the data from the actuator and/or the sensor and conducts said data via the wireless communication interface only if said data are important. Therefore, the quantity of data via the wireless communication interface can be reduced. However, owing to the small quantities of data in HVAC systems such a control adapter is not suitable for this field of application.

SUMMARY OF THE INVENTION

An object of the invention is to make it easier to carry out operator control of HVAC systems which are difficult to access.

According to the invention, this object is achieved by means of a control adapter which can be fastened on a device of an HVAC system (HVAC device) or in the vicinity thereof. The control adapter can communicate with the HVAC device via a near-field communication interface and can communicate with a remote-control device via another wireless communication interface.

This control adapter has the advantage that the control adapter only has to be fastened once in the vicinity of the HVAC device and the HVAC device can then be parameterized even from relatively large distances.

Further advantageous refinements are specified in the dependent claims.

In one exemplary embodiment, the control adapter has a housing having a first side, a second side lying opposite the first side, and a cutout. The cutout extends from the first side to the second side and is arranged relative to the wireless near-field communication interface in such a way that the cutout is suitable for aligning the wireless near-field communication interface of the control adapter relative to a wireless near-field communication interface of the HVAC device. This cutout permits the control adapter and the near-field communication interface contained therein to be aligned correctly with that of the HVAC device, since the HVAC device can be viewed through the cutout. Therefore, an alignment marking, e.g. a near-field communication symbol which is depicted on many HVAC devices, can be used to align the control adapter on the HVAC device.

An antenna of the wireless near-field communication interface is preferably arranged around the cutout, preferably with a common center point, with the result that when the cutout is aligned by means of a marking which indicates a near-field communication interface of the HVAC device the wireless near-field communication interface of the control adapter is perfectly aligned relative to the wireless near-field communication interface of the HVAC device. The correct alignment can therefore already be ensured at the first fastening, and the alignment does not have to be re-adjusted in order to establish the connection to the HVAC device. The cutout is preferably circular. As a result, a translatory alignment is defined without requiring rotational alignment. Diameters of the cutout between 9 and 13 mm result in an optimum compromise between a good degree of visibility of a marking and good alignment with a marking.

In one exemplary embodiment, the cutout is arranged centrally between a third side and a fourth side of the housing. As a result, an antenna of the wireless near-field communication interface can utilize the full width of the housing and nevertheless be arranged centrally around the cutout.

In one exemplary embodiment, the cutout is arranged closer to a fifth side than to a sixth side of the housing. This permits the antenna of the wireless near-field communication interface also to be allowed to extend as far as the fifth side and to arrange the necessary electronic components, connectors and switches on the sixth side.

In one exemplary embodiment, the wireless communication interface is a Bluetooth interface, a WLAN interface or some other communication interface with a larger range than the wireless near-field communication interface. These are present in many remote-control devices such as smartphones, tablets and portable computers, and are therefore particularly suitable.

In one exemplary embodiment, the first side has a fastening mechanism for removably fastening the control adapter on the HVAC device. This can be a suction mechanism or a magnetic surface. This permits the control adapter to be removed again after use. It would therefore be possible for the control adapters to be used by a maintenance team which uses the control adapters only during a maintenance operation on the HVAC device. However, the control adapters could also be permanently and non-removably fastened on the HVAC devices, in order to ensure continuous remote-control of the HVAC devices.

In one exemplary embodiment, the control adapter has a connector for a cable connection to the HVAC device, wherein the control circuit is designed to convert, in a first operating mode, the control signals received from the wireless communication interface into control signals of the wireless near-field communication interface and to transmit them to the HVAC device via the wireless near-field communication interface and to convert the control signals received from the wireless near-field communication interface into control signals of the wireless communication interface and to transmit them to the remote-control device via the wireless communication interface, and to convert, in a second operating mode, the control signals received from the wireless communication interface into control signals of the connector for the cable connection and to transmit them to the HVAC device via the connector for the cable connection, and to convert the control signals received at the connector for the cable connection into control signals of the wireless communication interface and to transmit them to the remote-control device via the wireless communication interface.

In one exemplary embodiment, the control circuit is designed to send initialization information to the remote-control device via the wireless near-field communication interface, with which initialization information the remote-control device can initialize the communication via the wireless communication interface. The connection between the control adapter and the remote-control device can therefore be initialized without manual configurations. Since the wireless near-field communication interface is used to transfer the initialization information, there is no need for any additional hardware to be provided in the control adapter. This exemplary embodiment is also possible without the cutout described above.

In one exemplary embodiment, the wireless near-field communication interface is arranged in the control adapter in such a way that communication with an external near-field communication interface on the first side and on the second side of the housing is possible. The wireless near-field communication interface can therefore also be used in the mounted state to communicate with other devices, such as e.g. the remote-control device.

BRIEF DESCRIPTION OF THE FIGURES

The invention will be explained in more detail on the basis of the appended figures, in which.

DESCRIPTION OF THE PREFERRED EMBODIMENTS

Figure 1:
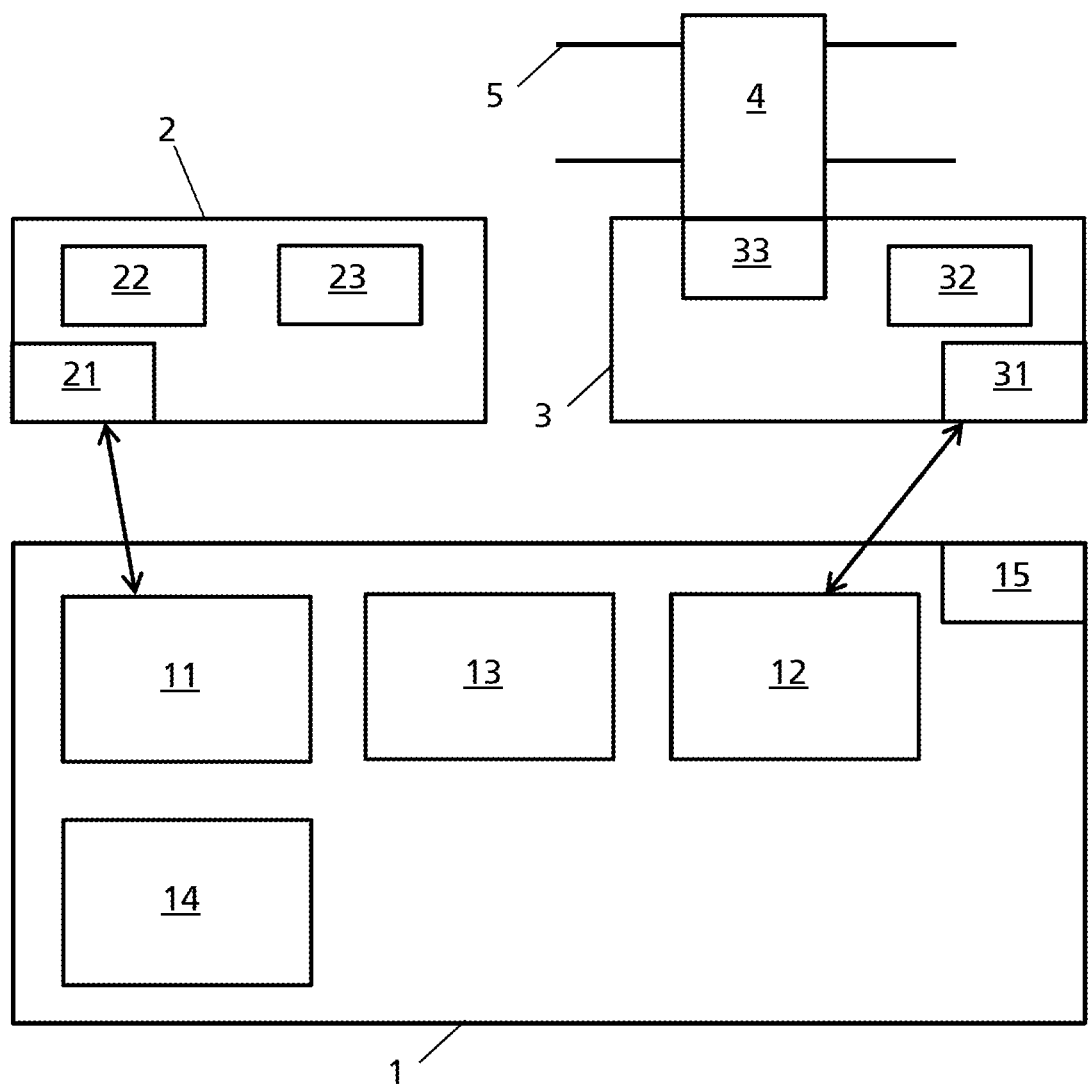
FIG. 1 shows a schematic view of the control system with an actuator for HVAC systems and with a control adapter.

FIG. 1 shows a schematic view of an exemplary embodiment of a control system for HVAC systems, in particular in the field of building technology. The control system has a control adapter 1, a remote-control device 2, an actuator 3 as an HVAC device and a fluid control mechanism 4. The exemplary embodiment is described with an actuator 3 as an HVAC device, wherein the invention can also be applied to other HVAC devices, such as for example sensors and control devices, and all disclosures relating to the actuator 3 can be analogously applied to other HVAC devices.

HVAC systems regulate one or more parameters of the ambient air, such as for example the temperature, air humidity, composition of the air, in buildings, rooms or other environments. This is achieved by air exchange, air filtering, heat exchanger, etc. An important component of HVAC systems are fluid control mechanisms 4, such as e.g. valves or flaps, for controlling a throughflow rate of a fluid through a fluid line, a fluid inlet or a fluid outlet 5. Both liquids (generally water) and gases (generally air) are used as the fluid. For the control of the throughflow rate, the fluid control mechanisms 4 can generally assume many positions between an open position and a closed position in the fluid line 5.

The actuator 3 converts an electrical control command into a mechanical position of the fluid control mechanism 4. For this purpose, the actuator 3 has a wireless near-field communication interface 31, a control circuit 32 and an actuating element 33.

The wireless near-field communication interface 31 is designed for the communication of control signals. The wireless near-field communication interface 31 is constructed in a passive form, i.e. is constructed as a transponder, with the result that an active reader device can also communicate with the actuator 3 when the latter is not supplied with current. However, it would also be possible to construct the wireless near-field communication interface 31 in an active form. The wireless near-field communication interface 31 is preferably an interface according to the standard ISO 18092 and/or ISO 14443 and/or ISO 15693. For example, the wireless near-field communication interface 12 communicates with a carrier frequency of 13.56 MHz.

The control signals which are exchanged at the wireless near-field communication interface 31 are designed to set or read out certain parameters of the actuator 3. Actuation signals for actuating the mechanical position of the actuator 3 are preferably not communicated via the wireless near-field communication interface 31 but rather via a further interface, e.g. a data bus line. A mechanical position of the actuator 3 is to be understood here as the current mechanical position of the actuator 3 which determines the mechanical position of the fluid control mechanisms 4 which are actuated by the actuator 3. In contrast, a parameter is an (electronically) storable setting of the actuator 3 which does not require the mechanical position of the actuator 3 to be changed, e.g. the minimum position and/or maximum position of the actuator 3, its rotational speed, etc. A parameter preferably differs from a mechanical position in particular in that the parameter can be changed by means of the wireless near-field communication interface 31 without the actuator 3 being supplied with current, while a power supply of the actuator 3 is necessary to change the mechanical position. This is achieved by virtue of the fact that the active reader device of the control adapter 1 supplies the transponder 31 with the necessary current in order to change or read out the desired parameter. However, in an alternative exemplary embodiment it is also possible for the control signals which are exchanged via the wireless near-field communication interface 31 also to contain the actuation signals for changing and for reading out the mechanical position of the actuator 3. In one operating state of the wireless near-field communication interface 31, the latter functions as a datalog interface and transmits all the relevant data, such as status data, ambient data, sensor data, parameter data, etc. to the remote-control device 2 which passes these data on to a Cloud memory. It is also possible to carry out a software/firmware update of the HVAC device via the wireless near-field communication interface 31.

The control circuit 32 controls the actuating element 33 on the basis of received actuation signals.

The actuating element 33 converts electrical actuation signals received from the control circuit 32 into a position of the actuating element 33. The actuating element 33 is preferably a motor, e.g. an actuating motor. However, other actuating elements 33, such as for example a piezo-actuator, can also be used. The actuating element 33 is connected to the fluid control mechanism 4, with the result that the position of the fluid control mechanism 4 can be regulated by means of the position of the actuating element 33.

The control adapter 1 is designed to exchange control signals between the remote-control device 2 and the actuator 3. The control adapter 1 has a wireless communication interface 11, a wireless near-field communication interface 12, a control circuit 13, an energy supply 14 and a connector 15.

The wireless near-field communication interface 12 is designed to communicate the control signals between the control adapter 2 and the actuator 3. The wireless near-field communication interface 12 is preferably active, i.e. an active reader device, with the result that the control adapter 1 can set and read out parameters of the actuator 3, even without a power supply of the actuator 3. This is advantageous, in particular, in the construction phase of projects in which although the actuators 3 are already mounted they are not yet connected to the power supply. These actuators 3 can therefore already be set in this early phase without a power supply. Furthermore, the wireless near-field communication interface 12 is designed to transmit the data which has been specified with respect to the wireless near-field communication interface 31. The range of the wireless near-field communication interface 12 is smaller than that of the wireless near-field communication interface 11. The wireless near-field communication interface 12 is preferably an interface according to the standard ISO 18092 and/or ISO 14443. The wireless near-field communication interface 12 preferably communicates with a carrier frequency of 13.56 MHz.

The wireless communication interface 11 is designed to communicate control signals between the remote-control device 2 and the control adapter 1.

Figure 6:
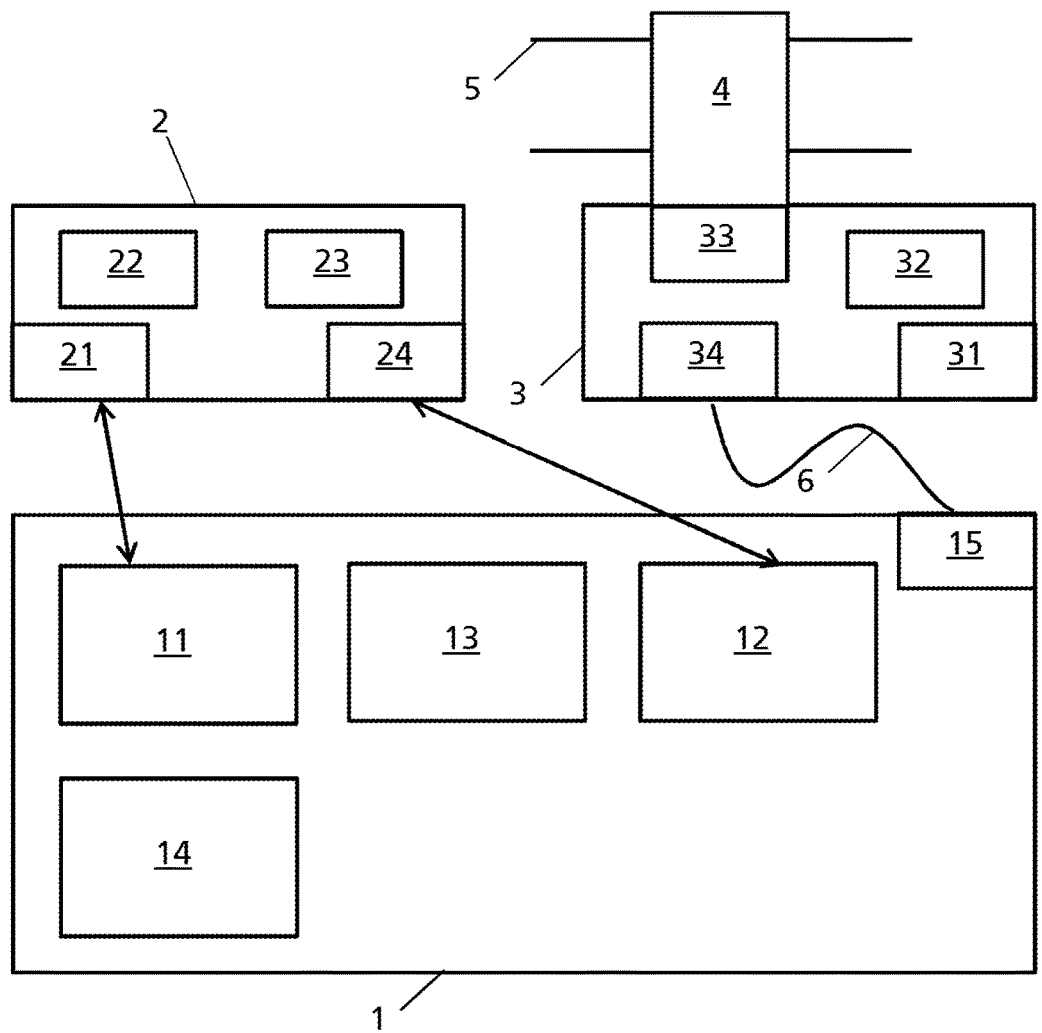
FIG. 6 shows a schematic view of the control system with an actuator for HVAC systems and with a control adapter in a second operating mode.

The optional connector 15 can constitute an alternative possible way of communicating with an actuator which does not have a wireless near-field communication interface. In this case, the control signals are exchanged between the actuator and the control adapter 1 via a cable connection. FIG. 6 shows such a cable connection between the actuator 3 and the control adapter 1. The connector 15 could be intended for a bus cable and is connected to the actuator 3 via a bus cable. In a different exemplary embodiment, the connector 15 could also be a USB port.

The control circuit 13 is designed to convert the control signals received from the wireless communication interface 11 into control signals of the wireless near-field communication interface 12 and to convert the control signals received from the wireless near-field communication interface 12 into control signals of the wireless communication interface 11. The control circuit 13 preferably reads out the digital information from the received analog control signals and generates new analog control signals for the respective other interface with the same or corresponding digital information. However, it is also possible for the control circuit 13 to be analog.

In one exemplary embodiment, the control circuit 13 is designed to communicate, in a first operating mode as described above, with the actuator 3 via the wireless near-field communication interface 12 (see FIG. 1), and to convert, in a second operating mode, the control signals received from the wireless communication interface 11 into control signals of the connector 15 for the cable connection 6, and to transmit them to the actuator 3 via the connector for the cable connection 6, and to convert the control signals received at the connector 15 for the cable connection 6 into control signals of the wireless communication interface 11 and to transmit them to the remote-control device 2 via the wireless communication interface 11 (see FIG. 6).

In a further alternative exemplary embodiment, the connector 15 could also replace the near-field communication interface 12, wherein the control circuit 13 then operates only in the second operating mode.

The energy supply 14 supplies the electronic components of the control adapter 1 with the necessary voltage. The energy supply 14 is preferably a battery. The battery can be a disposable battery or a re-chargeable battery such as, for example, a lithium-ion battery. Alternatively or additionally, the energy supply 14 can have a connector for a cable. The connector is preferably a USB port (e.g. micro USB). The connector can preferably be connected to the actuator 3. This has the advantage that the control adapter 1 is supplied by the actuator 3 and therefore does not require a separate power supply. The connector of the energy supply 14 can be the connector 15, with the result that both data and energy are transmitted via the connector 15. Alternatively other energy supplies 14 are possible.

The control adapter 1 preferably has LED signaling operations which indicate certain operating states. Therefore, an LED could indicate an existing connection of the wireless near-field communication interface 12 to the actuator 3 and/or an LED could indicate an existing connection of the wireless communication interface 11 to the remote-control device 2.

The remote-control device 2 is designed to exchange control signals with the actuator 3, in particular to input control commands to the actuator 3 and to read out control parameters from the actuator 3. The remote-control device 2 is preferably a tablet or a smartphone with an app for performing operator control of the actuator. Alternatively, the remote-control device 2 can also be a portable computer with a corresponding operator control program. Other remote-control devices 2 are also conceivable, such as for example the Belimo (registered trademark) tool. The remote-control device 2 has a wireless communication interface 2, a control circuit 22 and a user interface 23.

The wireless communication interface 21 is designed to communicate the control signals between the remote-control device 2 and the control adapter 1.

The user interface 23 is designed to control the actuator 3, in particular to input control commands and to read out control parameters. The user interface is preferably a touch screen. However, other user interfaces are also possible.

The control circuit 22 connects the user interface 23 and the wireless communication interface 21. The control circuit 22 presents parameters received preferably via the wireless communication interface 21, at the user interface 23 and transmits control commands input at the user interface 23 to the control adapter 2 via the wireless communication interface 21.

The remote-control device preferably has a connection to the Internet, via which data from the actuator 3 can be stored in a Cloud memory.

The wireless communication interface 21 and the wireless communication interface 11 are preferably a Bluetooth interface (registered trademark) which corresponds to the industrial standard IEEE 802.15.1. Alternatively, the wireless communication interface 21 and the wireless communication interface 11 can be a WLAN interface which corresponds to the industrial standard IEEE 802.11. However, other wireless communication interfaces 11 and 21 are also possible.

Figure 2:
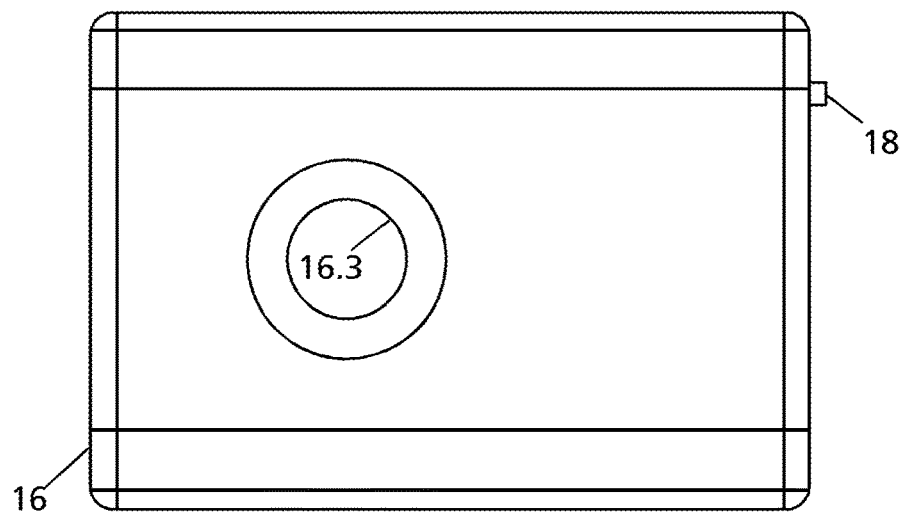
FIG. 2 shows a plan view of an exemplary embodiment of a control adapter.
Figure 3:
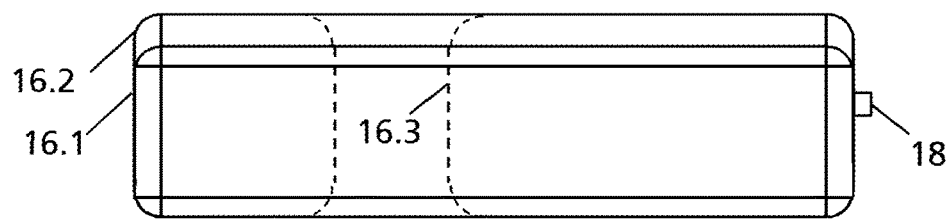
FIG. 3 shows a side view of the exemplary embodiment of the control adapter from FIG. 2.
Figure 4:
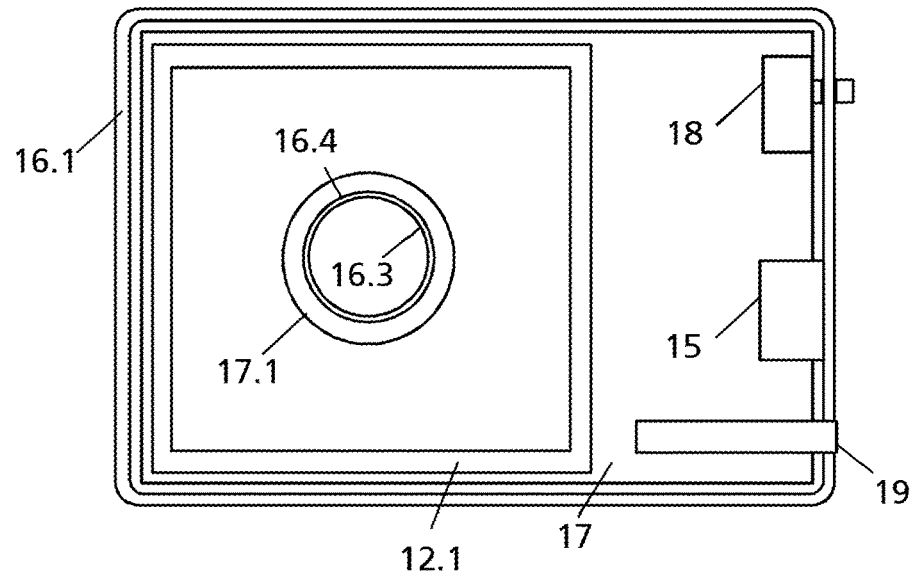
FIG. 4 shows a plan view of the exemplary embodiment of the control adapter from FIG. 2 without a housing cover.

FIGS. 2 to 4 show an exemplary embodiment of the control adapter 1. The control adapter 1 preferably has a housing 16 with a first side and a side (preferably parallel) lying opposite the first side. The housing 16 is preferably basically rectangular with a third side, fourth side, fifth side and sixth side which are arranged at a right angle with respect to the first and second sides, wherein the third side is arranged opposite the fourth side (preferably parallel), and the fifth side is arranged opposite the sixth side (preferably parallel). Basically the term at a right angle is to also include ergonomic rectangles here, such as rectangles with rounded and/or beveled corners, as can be seen in the exemplary embodiment in FIGS. 2 to 5. The first and second sides form the two largest side faces. The control adapter is preferably 6 to 7 cm, preferably 6.5 cm long (length of the first and second side) and 4 to 5 cm, preferably 4.5 cm, wide (width of the first and second sides) and 1 to 2 cm thick (width of the third to sixth sides).

A cutout 16.3 extends from the first side to the second side of the housing 16. When the control adapter 1 is aligned on the actuator 3, this continuous cutout 16.3 permits the actuator 3 to be viewed through the cutout. That is to say the cutout 16.3 makes it possible to see through the control adapter 1. The cutout 16.3 is arranged relative to an antenna of the wireless near-field communication interface in such a way as to permit, with the cutout 16.3, the correct positioning or alignment of the control adapter 1 on the actuator 3 for an optimum connection. In this context, use is made of the fact that the optimum position for near-field communication is marked on a large number of actuators 3 with a near-field communication marking 35 (see FIG. 5). Since this marking is, however, concealed by the control adapter when said control adapter 1 is being positioned, optimum positioning of a near-field communication device is made difficult in the prior art. The marking on the actuator 3 can be viewed through the cutout 16.3 when the control adapter 1 is aligned in an optimum way. The antenna is preferably arranged around the cutout 16.3, with the result that there is a connection for a near-field communication in the cutout 16.3. The center point of the cutout 16.3 is preferably arranged at the center point of the antenna.

The cutout 16.3 is preferably circular and extends with its longitudinal axis at a right angle with respect to the first side and/or second side and/or in parallel with the third, fourth, fifth and/or sixth side. The cutout preferably has a diameter of 0.5 to 1.5 cm, in particular of 1.1 cm. However, other shapes of the cutout 16.3 are possible. The cutout 16.3 is arranged in the center between the third and fourth sides. The cutout is shifted approximately in the direction of the fifth side. As a result, in addition to the antenna there is also sufficient space for electrical components and/or connectors on the sixth side. For example a current switch 18 is arranged as connectors on the sixth side, which current switch 18 connects the electrical components to the energy supply 14, or disconnects them therefrom, depending on the switched state, in order to switch the control adapter 1 on or off. In addition, the connector 15 which has already been described is arranged on the sixth side (see FIG. 4). A further connector on the sixth side is a lightguide 19. However, the connectors, switches or components could also be arranged differently.

The housing 16 is constructed from a housing shell 16.1 on the first side and a housing cover 16.2 on the second side. FIG. 4 shows the housing shell 16.1 from the second side without housing cover 16.2. This permits a circuit board 17 with the electronic components of the control adapter 1 to be mounted in the housing shell 16.1, and the housing 16 to close with the housing cover 16.2. The circuit board 17 is preferably arranged in parallel with respect to the first and/or second side. Any other embodiment of the housing 16 is possible.

The circuit board 17 has a conductor track 12.1 which runs around the cutout 16.3 and which forms the antenna of the wireless near-field communication interface 12. The conductor track 12.1 can form a closed circuit with a common feed or an open circuit with separate feeds for the ends of the circuit. The conductor track 12.1 is embodied here in a rectangular or square shape, wherein other shapes, such as circular, are also possible. In the exemplary embodiment, the entire width of the control adapter 1 is used to form the antenna 12.1. For this purpose, the circuit board 17 is arranged over the entire width (and over the entire length) of the control adapter 1 and of the housing 16, respectively. The conductor track 12.1 runs along the edges of the third, fourth and fifth sides of the circuit board 17 (the numbering of the sides corresponds to the sides of the housing). The conductor track 12.1 is here basically embodied in a square shape with a side length of 4 cm. The circuit board 17 has a cutout 17.1 through which the walls 16.4 of the housing 16 run, said walls 16.4 forming the cutout 16.3.

Figure 5:
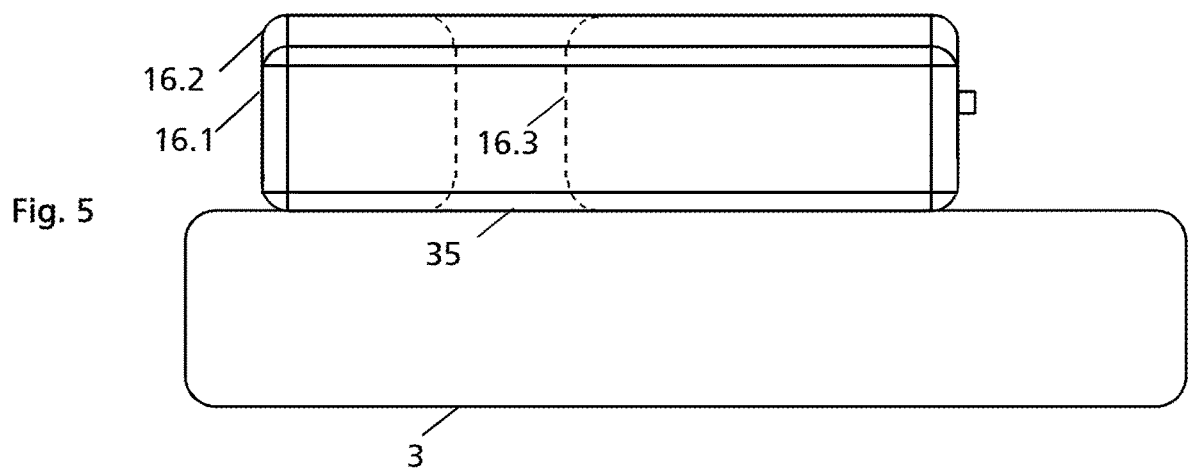
FIG. 5 shows a side view of the exemplary embodiment of the control adapter from FIG. 2 mounted on an actuator for HVAC systems.

FIG. 5 shows the control adapter 1 with the first side fastened on the actuator 3. Re-usable fastening means are preferably used for the fastening. This can be, for example, a suction cup film, an adhesive film, which adheres as a result of Van der Waals forces, or a magnetic film on the first side of the control adapter 1. Alternatively, the control adapter 1 could be fastened on the actuator 3 with a snap-action mechanism of the control adapter 1 and/or of the actuator 3. However, other possible ways of fastening, such as screwing, riveting, bonding, etc. are also possible.

FIG. 6 shows, in addition to the second operating mode of the control adapter 1 or the control circuit 13 thereof which has already been described, a further third operating mode. In the third operating mode, initialization information is sent to the remote-control device 2 via the wireless near-field communication interface 12, with which initialization information the remote-control device 2 can initialize the communication via the wireless communication interface 11. If the remote-control device 2, which for this purpose must also have a wireless near-field communication interface 24, is held in the vicinity of the control adapter 1, the latter receives the initialization information of the control adapter 1, and the control circuit 22 of the remote-control device 2 can set the parameters of the wireless communication interface 21 in such a way that it can communicate with the wireless communication interface 11 of the control adapter 1.

The third operating mode is advantageous, in particular, in combination with the second operating mode, since the wireless near-field communication interface 12 is then not required for the communication with the actuator 3. Therefore, the second and third operating modes could be detected if an actuator 3 is detected at the connector 15. However, the transmission of the initialization information via the wireless near-field communication interface 12 can also be realized by means of other mechanisms, e.g. a switch or detection of the type of device connected to the wireless near-field communication interface 12. It would therefore also be conceivable firstly to use the wireless near-field communication interface 12 for the initialization of the communication with the remote-control device 2 (third operating mode) and then for the communication with the actuator 3 (first operating mode).

The invention is not limited to the described exemplary embodiments.

What is claimed is:

1. A control adapter for fastening on a heating, ventilation and/or air conditioning ("HVAC") device, the control adapter having:
   a wireless communication interface for communicating control signals between a remote-control device and the control adapter;
   a wireless near-field communication interface for communicating control signals between the control adapter and the HVAC device;
   a control circuit for converting the control signals received from the wireless communication interface into control signals of the wireless near-field communication interface and for converting the control signals received from the wireless near-field communication interface into control signals of the wireless communication interface;
   a housing having a first side, a second side lying opposite the first side, and a first cutout which extends from the first side to the second side and which is arranged relative to the wireless near-field communication interface in such a way that the first cutout is configured for aligning the wireless near-field communication interface of the control adapter relative to a wireless near-field communication interface of the HVAC device by viewing, through the first cutout, a mark on a side of the HVAC device that faces the control adapter.

2. The control adapter as claimed in claim 1, wherein an antenna of the wireless near-field communication interface is arranged around the first cutout.

3. The control adapter as claimed in claim 2, wherein the antenna is embodied as a conductor track, made to extend around the first cutout, of a printed circuit board.

4. The control adapter as claimed in claim 2, wherein the center point of the antenna coincides with the center point of the first cutout.

5. The control adapter as claimed in claim 1, wherein the cutout is circular.

6. The control adapter as claimed in claim 1, wherein the longitudinal axis of the first cutout extends perpendicular to the first side and/or the second side.

7. The control adapter as claimed in claim 1, having a circuit board which has the wireless communication interface, the wireless near-field communication interface, the control circuit and further electrical elements of the control adapter.

8. The control adapter as claimed in claim 7, wherein the circuit board is arranged parallel with respect to the first side and/or second side of the housing, the circuit board having a second cutout through which walls forming the first cutout of the housing are guided.

9. The control adapter as claimed in claim 1, wherein the wireless communication interface is a Bluetooth interface or a WLAN interface.

10. The control adapter as claimed in claim 1, wherein the control circuit is designed
    to read out control data from the control signals received at the wireless communication interface and to generate a control signal of the wireless near-field communication interface with the read-out control data, and
    to read out control data from the control signals received at the wireless near-field communication interface and to generate a control signal of the wireless communication interface with the read-out control data.

11. The control adapter as claimed in claim 1, wherein the first side has a fastening mechanism for removably fastening the control adapter on the HVAC device.

12. The control adapter as claimed in claim 1, having a connector for a cable connection to the HVAC device, wherein the control circuit is designed
    to convert, in a first operating mode, the control signals received from the wireless communication interface into control signals of the wireless near-field communication interface and to transmit them to the HVAC device via the wireless near-field communication interface and to convert the control signals received from the wireless near-field communication interface into control signals of the wireless communication interface and to transmit them to the remote-control device via the wireless communication interface, and
    to convert, in a second operating mode, the control signals received from the wireless communication interface into control signals of the connector for the cable connection and to transmit them to the HVAC device via the connector for the cable connection, and to convert the control signals received at the connector for the cable connection into control signals of the wireless communication interface and to transmit them to the remote-control device via the wireless communication interface.

13. The control adapter as claimed in claim 1, wherein the control circuit is designed to send initialization information to the remote-control device via the wireless near-field communication interface, with which initialization information the remote-control device can initialize the communication via the wireless communication interface.

14. The control adapter as claimed in claim 1, wherein the wireless near-field communication interface is arranged in the control adapter in such a way that communication with an external near-field communication interface on the first side and on the second side of the housing is possible.

15. A control system comprising:
    a heating, ventilation and/or air conditioning ("HVAC") device, and
    a control adapter for fastening on the HVAC device, the control adapter having:
        a wireless communication interface for communicating control signals between a remote-control device and the control adapter;
        a wireless near-field communication interface for communicating control signals between the control adapter and the HVAC device;
        a control circuit for converting the control signals received from the wireless communication interface into control signals of the wireless near-field communication interface and for converting the control signals received from the wireless near-field communication interface into control signals of the wireless communication interface; and
        a housing having a first side, a second side lying opposite the first side, and a cutout which extends from the first side to the second side and which is arranged relative to the wireless near-field communication interface in such a way that the cutout is suitable for aligning the wireless near-field communication interface of the control adapter relative to a wireless near-field communication interface of the HVAC device, wherein the HVAC device has, on a side facing the control adapter, a mark which, when the control adapter is aligned on the HVAC device, can be viewed through the cutout.

16. The control system as claimed in claim 15, wherein the control adapter is mounted with the first side on the HVAC device and can exchange control signals with the HVAC device via the wireless near-field communication interface.

17. The control system as claimed in claim 15, also having a remote-control device having a wireless communication interface which is designed to communicate the control signals to the wireless communication interface of the control adapter, a user interface with a touch screen and a control circuit for controlling the user interface and the wireless communication interface.

18. The control system as claimed in claim 17, wherein the remote-control device also has a near-field communication interface, wherein the control circuit is designed to configure the wireless communication interface, on the basis of initialization information obtained via the wireless near-field communication interface, via the wireless near-field communication interface of the control adapter for the communication with the wireless near-field communication interface of the control adapter.

* * * * *